UNITED STATES PATENT OFFICE.

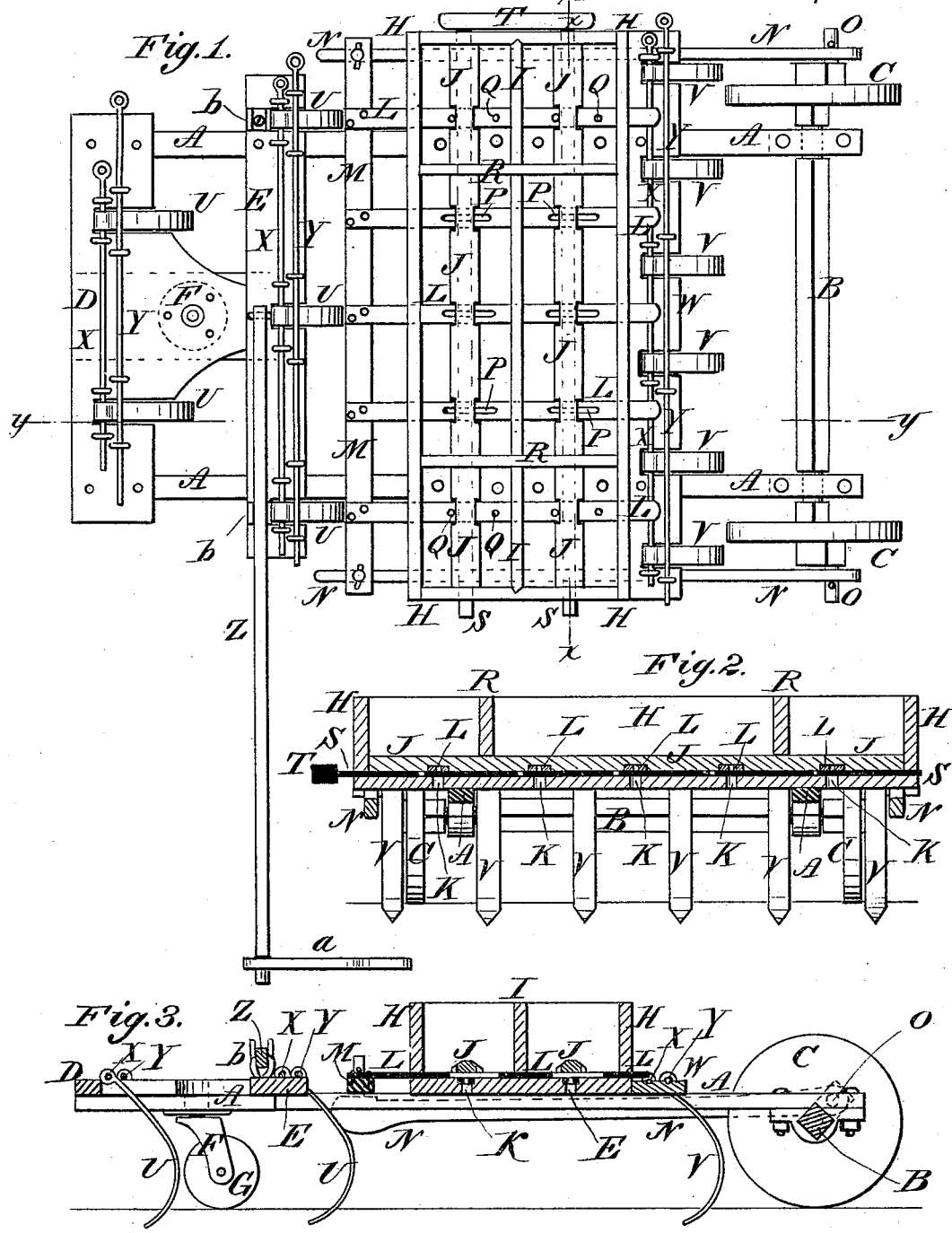

NORMAN MERENESS, OF SEWARD, NEW YORK.

SEED PLANTER AND DRILL.

SPECIFICATION forming part of Letters Patent No. 250,936, dated December 13, 1881.

Application filed August 9, 1881. (No model.)

*To all whom it may concern:*

Be it known that I, NORMAN MERENESS, of Seward, in the county of Schoharie and State of New York, have invented certain new and useful Improvements in Seed Planters and Drills, of which the following is a specification.

In the accompanying drawings, Figure 1 is a plan view of my improvement. Fig. 2 is a sectional front elevation of the same, taken through line $x\ x$, Fig. 1. Fig. 3 is a sectional side elevation of the same, taken through the line $y\ y$, Fig. 1. Fig. 4 is a plan view of one of the slides for dropping the seed in hills.

Similar letters of reference indicate corresponding parts.

The object of this invention is to facilitate and promote accuracy in the planting and drilling of seeds and the distribution of fertilizers.

In the drawings, A represents the frame of the machine, to the rear ends of the side bars of which are attached bearings to receive an axle, B, having wheels C attached to its ends.

To the rearward projection, formed upon the front cross-bar or draft-bar, D, of the frame A, or to a bar attached to the draft-bar D and the front plow-bar, E, is swiveled the standard F of the caster-wheel G, by which the forward part of the machine is supported, and which allows the machine to be turned easily and in small space.

To the frame A, a little in the rear of its center, is attached the hopper H, which is divided longitudinally by a partition, I, into two compartments, the forward compartment being intended to receive seed, and the rear compartment being intended to receive a fine fertilizer.

To the bottom of the hopper H, in the center of each of the longitudinal compartments, is secured a cut-off cleat, J, directly over the discharge-holes K in the bottom of the said hopper.

In the lower sides of the cleats J, and directly over the discharge-holes K, are formed cross-grooves to receive the seed-dropping slides L, which pass through apertures in the front and rear sides of the hopper H, and in the partition I. The forward ends of the seed-dropping slides L are attached to a cross-bar, M, that rests and slides upon the side bars of the frame A.

To the ends of the cross-bar M are pivoted the forward ends of the connecting-bars N, which pass back beneath the end parts of the hopper H, and are pivoted at their rear ends to crank-pins or cranks O, attached to the wheels C, or to the ends of the axle B, so that the dropping-slides L will be moved forward and back at each revolution of the wheels C.

In each slide L, beneath each cleat J, is formed a slot, P, of a length a little greater than the length of a stroke of the said slides L. With this construction, as the slides L move in either direction, the seed from the slots P, beginning at the forward end of the said slots, will drop successively and continuously through the holes K to the ground, so that the said seeds will be planted in drills, the seeds entering the forward parts of the slots P as the slides L advance, ready to be dropped during the return movement. The fertilizer from the other compartment of the hopper H will be dropped in the same way.

When the machine is to be used for planting the seed in hills, the slides to be used are replaced by slides having holes Q formed in them, and the slides not to be used are detached and replaced with slides without slots or holes; or cross-partition R can be attached to the hopper H to form compartments over the slides to be used. In case a hill is to be dropped for each revolution of the drive-wheels C, a single hole is formed in each slide L in each compartment. In case a hill is to be dropped at each half-revolution of the drive-wheels C, two holes are formed in each slide L in each compartment; and in case a hill is to be dropped at each quarter-revolution of the drive-wheels C, three holes are formed in each slide in each compartment. The latter arrangement is shown in Fig. 4.

In the bottom of the hopper H, below each cleat J, is formed a longitudinal groove to receive the slide S. The outer ends of the two slides S are connected by a bar, T, so that the two slides can be moved together. In the slides S are formed holes in such positions as to be directly over the discharge-holes K when the said slides S are pushed fully in. With this construction, by drawing the slides S outward a little, so as to withdraw the holes in the said slides from the discharge-holes K, the said discharge-holes K will be covered, so that the machine can be drawn from place to place and turned around without wasting seed. Channels are opened directly below each seed-dropping slide L to receive seed by the plows U, which are attached alternately to the forward plow-bar, E, and the draft-bar D, to prevent the channels opened by the plows from being filled by the soil thrown by the adjacent plows, and to prevent clogging.

The seed is covered by the plows V, placed midway between the slides L, and attached to the rear plow-bar, W, which is secured to the frame A in the rear of the hopper H. The plows U V are made of spring-steel, and are hinged to their bars by rods X, passed through eyes in the upper ends of the said plows, and through staples or other keepers attached to the said bars. The plows U V are held down to their work by rods Y, placed above their upper parts, and passed through staples or other keepers attached to the bars D E W. The elasticity of the plows allows each plow to yield independently of the others to pass obstructions. When passing from place to place the plows U V can be supported above the ground by withdrawing the rods Y and replacing them in their staples below the upper parts of the said plows.

To the center of the forward plow-bar, E, is hinged the end of a bar, Z, so that the said bar can be turned down at either side of the machine. To the outer end of the hinged bar Z is pivoted the end of a bar, a, which is made of such a length that its lower end will drag upon the ground and form a mark to serve as a guide to the driver in planting the rows at equal distances apart, the bar Z being made of such a length that the mark made by the drag a will be directly under the center line of the machine at its next passage. The bar Z, when turned down, rests in a slotted or forked support, b, attached to the side bars of the frame A, to hold the said bar against the pull of the drag a.

Having thus fully described my invention, I claim as new and desire to secure by Letters Patent—

The combination, with the beams or bars and the hinged elastic teeth, of the detachable rods Y, whereby the teeth are held, elevated, or depressed, as shown and described.

NORMAN MERENESS.

Witnesses:
ABRAHAM A. MERENESS,
MARTIN J. SOMMERS.